May 5, 1942.   W. B. KLEMPERER   2,281,772
GUN INSTALLATION
Filed Oct. 23, 1939    6 Sheets-Sheet 1

WOLFGANG B. KLEMPERER,
INVENTOR;

BY 
ATTORNEY.

May 5, 1942. W. B. KLEMPERER 2,281,772
GUN INSTALLATION
Filed Oct. 23, 1939 6 Sheets-Sheet 4

Fig. 4

WOLFGANG B. KLEMPERER,
INVENTOR;
BY
ATTORNEY.

May 5, 1942.  W. B. KLEMPERER  2,281,772
GUN INSTALLATION
Filed Oct. 23, 1939      6 Sheets-Sheet 5

WOLFGANG B. KLEMPERER, INVENTOR;
BY
ATTORNEY.

May 5, 1942.                W. B. KLEMPERER                2,281,772
                              GUN INSTALLATION
                          Filed Oct. 23, 1939          6 Sheets-Sheet 6

WOLFGANG B. KLEMPERER,
INVENTOR;

BY
ATTORNEY.

Patented May 5, 1942

2,281,772

UNITED STATES PATENT OFFICE 2,281,772

GUN INSTALLATION

Wolfgang B. Klemperer, Los Angeles, Calif., assignor to Douglas Aircraft Company, Inc., Santa Monica, Calif., a corporation of Delaware Application October 23, 1939, Serial No. 300,789

20 Claims. (Cl. 33—50)

My invention relates to gun installations wherein a movable gun and a gun sight are mounted in association, and relates in particular to means whereby a gun may be mounted and operated in a restricted area.

It is an object of the invention to provide a gun mount enabling the mounting of a gun and the gun sight therefor in a position where but little room is available for occupancy of a gunner. The invention is of especial utility with, but not limited to, the tail, wings, and nacelles of aircraft where these parts provide only restricted room or space for the mounting of the gun and gun sight and for the gunner who is to aim and operate the gun.

It is a further object of the invention to provide armament for protection of those parts of an aircraft which now constitute the blind spots in the defense of the aircraft. Such a blind spot is the space to the rear of the tail of an airplane for the reason that the tail control structure of an aircraft lies between the gun turrets on the fuselage and the space disposed to the rear of the tail. Difficulty has been encountered in the mounting of a gun in the tail of an airplane for the reason that even in craft of relatively large size the space in the tail is relatively restricted due to the convergence of the external wall of the tail structure. The present invention makes possible the use of a gun, under control of a gunner, in small structures, such as the tail of an airplane, providing just sufficient room to receive the gunner, but permitting him little or no movement.

In the ordinary use of a machine gun, the butt of the gun swings as the gun is aimed, and the gun sight is ordinarily mounted on a swingable gun support. The gunner must move his head and ordinarily at least the upper part of his body so as to keep his eye aligned with the gun sight as the gun is swung from one position to another. It is an object of the present invention to provide a gunnery device wherein the gun may be readily swung in universal movement for the purpose of aiming, without the necessity for the gunner to move his head from position to position to follow the movement of the gun. Accordingly, the invention makes it possible to use a gun in the tail of an airplane or in other housings of similar small size. The present invention makes it possible, under conditions such as set forth in the foregoing, to mount a gun so that it may have universal movement in an angular range of at least 20° in any direction from the longitudinal axis of the aircraft fuselage, to cover the blind spot at the tail of the airplane.

It is an object of the invention to provide an aircraft having a gun to shoot rearward from the tail thereof and a chamber spaced in close proximity to the gun for occupancy of the gunner, so that he may direct or produce movement of the gun to fire the same within an angular range or cone of space sufficient to provide protection for the aircraft against attack from the rear of the tail structure.

It is a further object of the invention to provide a gunnery means comprising a gun supported for universal movement so that it may be aimed, and having sighting means for the gun, the eye piece of which is so positioned that substantially no movement of the gunner's head is required in use of the gun sight to aim the gun at a target situated within the angular range of the gun. The invention makes it possible to reduce the space required for the mounting of the gun and for occupancy by the gunner to substantially a minimum, for the reason that space need not be provided to allow movement of the gunner's body as is ordinarily necessary to enable him to follow with his eye the eyepiece of a gun sight which moves with the gun.

It is a further object of the invention to provide a gunnery device wherein the gun is movably supported relative to the wall structure of an enclosure, and wherein at least the eyepiece of the gun sight remains in a fixed relation to the supporting structure in which the gun is pivotally mounted for swinging movement enabling it to be aimed at a target.

It is a further object of the invention to provide a gunnery device including a gun swingable for the purpose of aiming the same, a means for producing a visual image of the field in which the gun may be aimed, and also means moving in accordance with the movement of the gun to indicate in the image of the field the point at which the gun is aimed at any time.

A further object of the invention is to provide, in conjunction with the gun which is movable for the purpose of aiming, a gun sight having means for producing in a focal plane an image of the field in which the gun may be aimed, a reticule movable substantially in the focal plane and means for operatively connecting the gun with the reticule to move the same in accordance with the movement of the gun. In the preferred form of the device, the gun sight, which remains in a fixed position relative to the supporting structure, produces a visible image of the field in which the gun may be aimed. The reticule indicates in the visible image the point in the field at which the gun is aimed at any time. Through its operative connection with the gun, the reticule is moved from point to point across the image as the gun is moved so as to be directed at different points in the field. When the reticule coincides with the visual image of a target in the field, information is imparted to the gunner that the gun is pointed at the target. In a preferred practice of the invention, the reticule embraces a central point and concentric rings to which reference may be had by the gunner in correcting for trajectory, deflection, etc.

It is a further object of the invention to provide an aircraft tail structure having a telescope projecting therefrom in a fixed position and walls or doors which form a portion of the external wall structure of the aircraft tail, with means for moving such doors or walls into open position so as to provide a port through which the gun may project and in which it may be moved for purpose of aiming, with means enabling the gunner to use the image obtained in the optical system of the telescope as a guide for aiming of the gun. In accordance with the preferred practice of the invention, the telescope is continuously sighted upon a prescribed area or field and any object which enters this area will be in view of the gunner, who, when he perceives a target in his range of vision may be guided in pointing the gun at the target by reference to the position and movement of the reticule in the image of the field.

It is an object of the invention to provide a telescopic gun sight of the character described, having means for preventing fogging of its interior lens surfaces, such means comprising a means for dehydrating the air which enters the shell or housing which encloses the lens system.

Further objects and advantages of the invention will be brought out in the following part of the specification.

Referring to the drawings, which are for illustrative purposes only.

Figure 1:
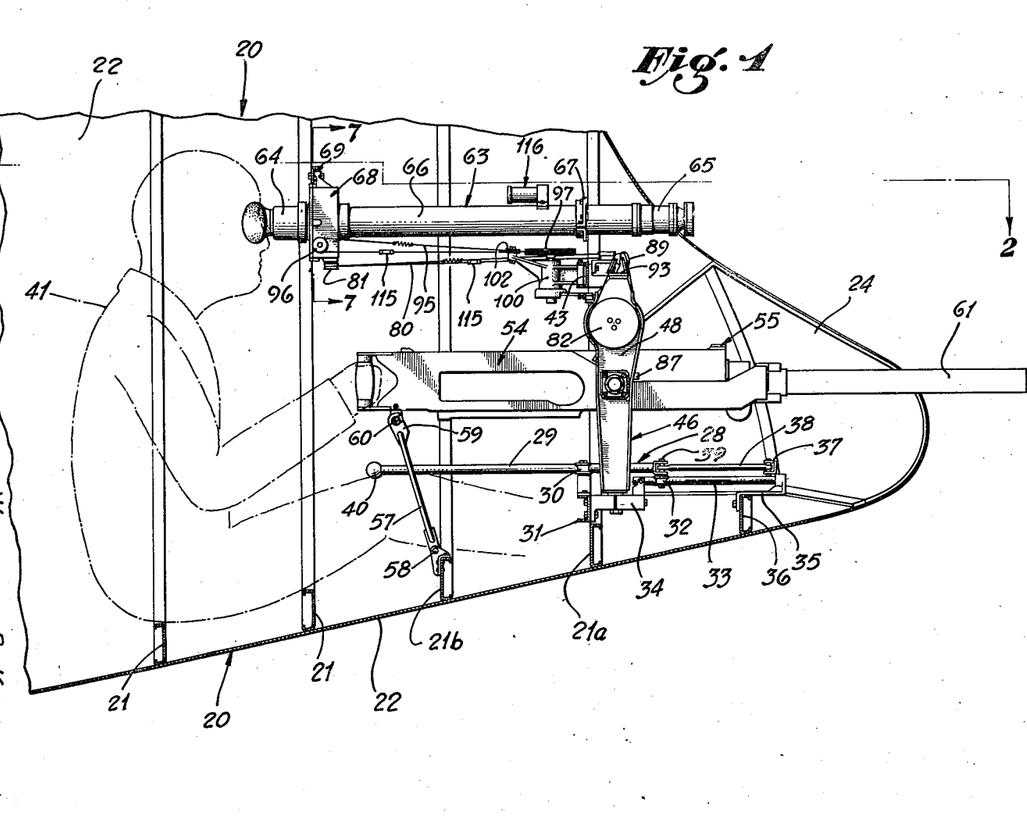
Fig. 1 is a side elevation showing a preferred embodiment of my present invention with a gunner in normal position for manipulation of a gun.
Figure 2:
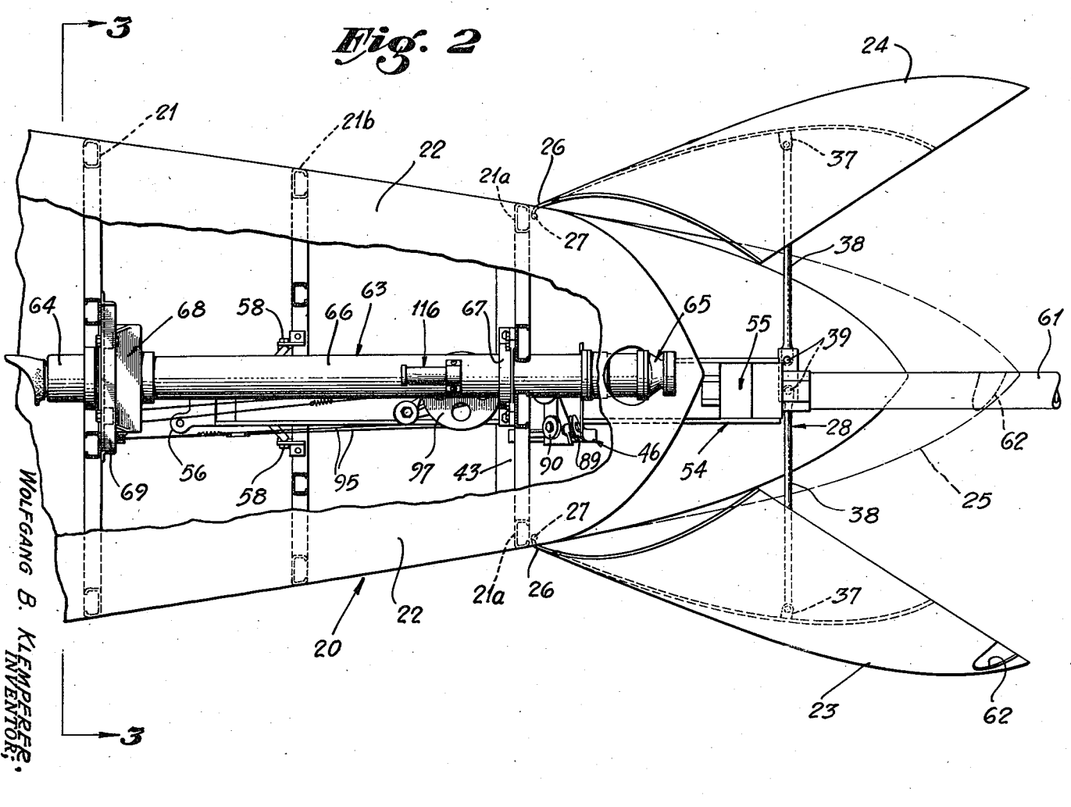
Fig. 2 is an enlarged fragmentary plan view taken substantially as indicated by the line 2—2 of Fig. 1.
Figure 3:
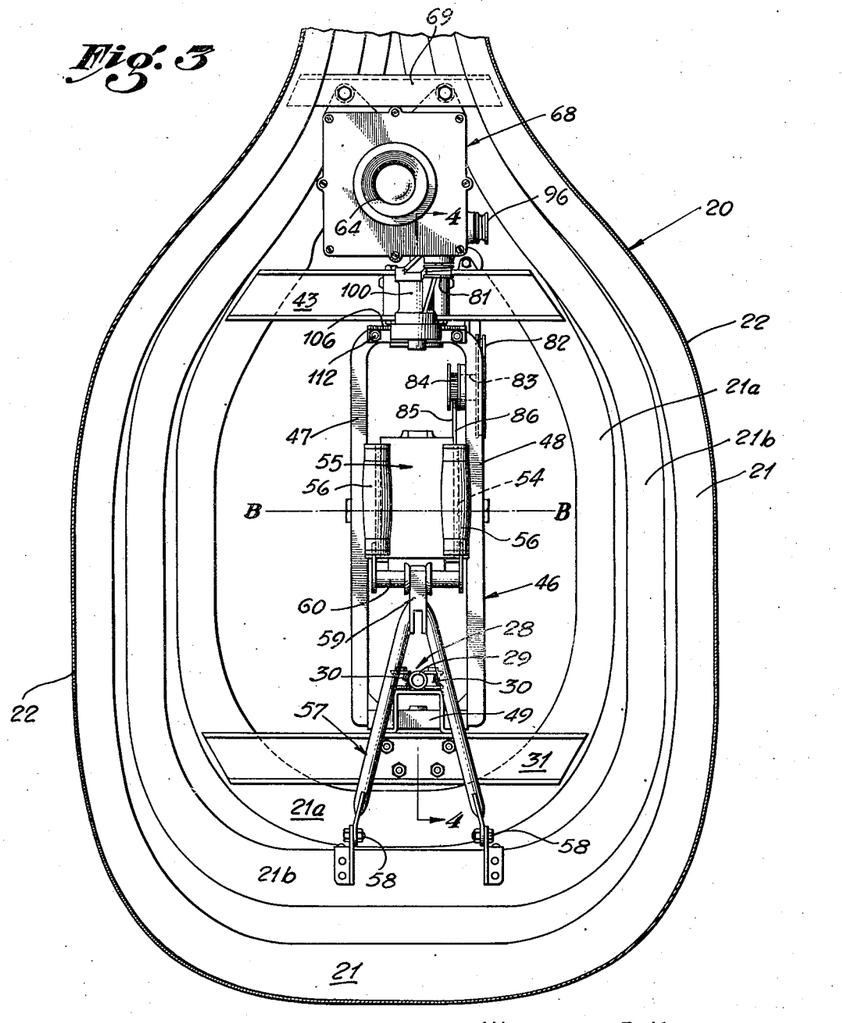
Fig. 3 is an enlarged fragmentary cross-section taken substantially as indicated by the line 3—3 of Fig. 2.

In Figs. 1 to 3 I show somewhat diagrammatically the tail structure 20 of an aircraft. In modern airplanes this tail structure is of somewhat oval cross-section and comprises a wall which tapers rearward to a thin vertical edge or pointed end. From this tail structure the empennage members of the craft project, such members including rudder, stabilizer fins and elevators, which parts are not shown herein for the reason that the principles of application thereof are well known. The wall of the tail structure may include a plurality of metal ribs 21 to which a suitable covering element 22 is applied, such covering element preferably being sheet aluminum, which forms the external surface of the wall. At the extremity of the tail structure, portions 23 and 24 of the wall are hingedly supported so as to provide doors which may be swung outward from closed relation, as shown by dotted lines 25, to open relation, as shown by full lines in Fig. 2. The front edges 26 of these door members 23 and 24 are secured by hinges 27 to the essentially vertical portions of the rib 21a. It is upon these hinges 27 that the doors are swung between closed and open positions by an actuating means 28, which may be in the form of a simple toggle, as shown.

The door actuating means 28 consists of a longitudinal rod 29 supported by rollers 30 carried on a cross brace 31 which is secured to the rib 21a, and by means of a single roller 32 which projects down from the front end of the rod 29 so as to lie between a pair of parallel guide rods 33, the front ends of which are supported on a bracket 34 which projects rearward from the cross brace 31, and the rear ends of which guide rods 33 are carried by a bracket 35 secured to a wall reinforcing member 36 disposed rearward of the rib 21a. As shown in Figs. 1 and 2 small clevises 37 are secured to the inner faces of the door members 23 and 24, and toggle bars or struts 38, hingedly connected to the members 37, are extended to hinge pins 39 supported by the front end of the longitudinal bar 29. The rod 29 has a handle 40 at its forward end by which it may be given longitudinal movement by the gunner 41 shown in Fig. 1. When the rod 29 is shoved rearward from the position in which it is shown in Fig. 1, the hinge pins 39 at the rear end thereof will swing the toggle bars 38 into aligned position between the clevises 37, as shown in Fig. 2, so that the doors 23 and 24 will be held in open position. As the rod 29 is pulled forward from its position of Fig. 2 so that the hinge pins 39 are moved forward to their positions in Fig. 1, the inner ends of the toggle bars 38 will be swung forward toward the angular or retracted position in which they are shown in Fig. 1 and the toggle formed by these bars 38 will be thus collapsed, and as the bars 38 move into diagonal relationship the doors 23 and 24 will be moved into closed position.

Figure 4:
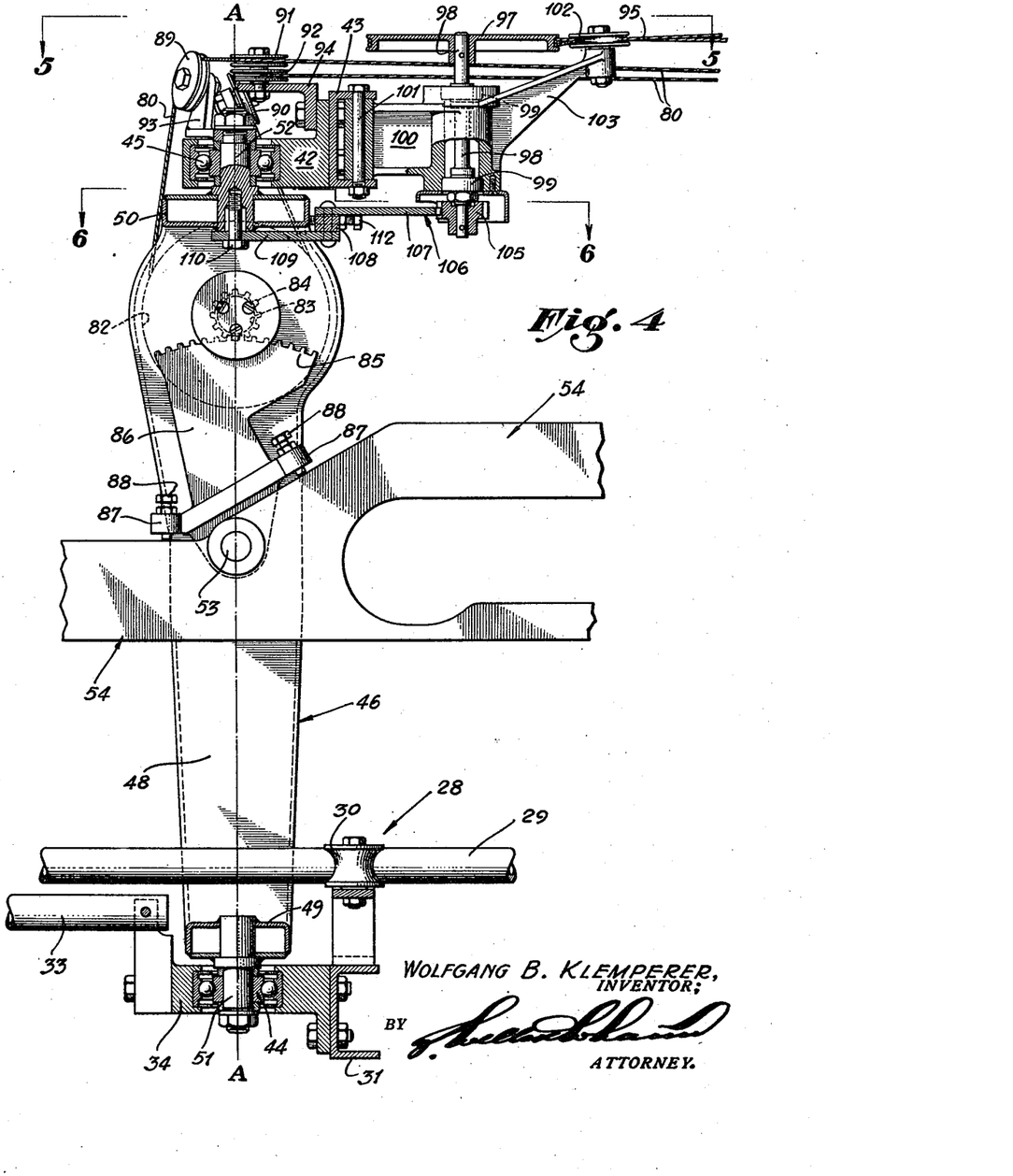
Fig. 4 is an enlarged fragmentary partly sectioned view taken substantially as indicated by the line 4—4 of Fig. 3 to show the swivel supporting means for the gun and the means for transmitting to the reticule mechanism of the gun sight movements corresponding to the movements of the gun.

Above the bracket 36 there is a bracket 42 which is secured to a face of a lateral cross brace 43, which is likewise secured to the rib 21a in a position spaced above the cross brace 31. As best shown in Fig. 4, the brackets 34 and 42 carry vertically aligned ball bearings 44 and 45, by which a gun yoke 46 is supported for rotation on the vertical axis A—A, Fig. 4, after the manner of a gimbal ring.

This gun support comprises a pair of side members 47 and 48 in laterally spaced vertical planes and connected at their lower and upper ends, respectively, by members 49 and 50. Pivot pins 51 and 52 project respectively from the members 49 and 50 into the bearings 44 and 45, thereby providing the means of engagement of the yoke 46 with the bearings in which the yoke is swung on a vertical axis. Horizontal stub shafts 53 extend substantially centrally of the yoke 46 to carry a gun supporting bracket or cradle 54 which receives a gun, such as a machine gun, 55. As shown in Fig. 1, the gun cradle 54 has grips 56 to be movably engaged by the gunner 41, who may swing the gun 55 with universal movement on the crossing axes A—A and B—B. The vertical component of the universal movement results in a swinging of the gun on the axis B—B of the yoke 46, and the horizontal component of this movement results in a rotation of the yoke 46 on the axis A—A. To hold the gun in a fixed position of non-use, a strut 57 is provided, this strut being connected by hinges 58 to a rib 21b and having a hook 59 at its free end to engage a bar 60 which is connected to the inner end of the gun cradle 54. When the gun is secured in a position of non-use, as shown in Fig. 1, the barrel 61 thereof will project through a suitable aperture 62 provided between the meeting edges of the doors 23 and 24. This aperture 62, as shown in Fig. 2, may be formed in the edge of one of the doors, for example, the door 23.

For use of the gunner 41 to aim the gun 55, a telescopic gun sight 63 is mounted in a position above the gun and so that the field piece 65 thereof will be directed toward the area or field lying to the rear of the tail of the aircraft. The cone space of the angular field of the telescopic gun sight 63 covers slightly more than the field in which the gun may be aimed and fired, thereby making it possible to fire the gun at any point or target which may appear in the visual image brought by the gun sight 63 to the eye of the gunner. The gun sight 63 comprises a complement of optical lenses including an eyepiece lens system in the eyepiece 64, and also an objective lens system, with suitable erecting lenses disposed therebetween. Preferably the lenses of the gun sight 63 are all enclosed by a suitable housing, comprising the tubular structure 66 which is rigidly secured to the aircraft structure by means of a bracket 67. This housing for the lens system also includes a reticule box 68, which is connected by means of an angle 69 to the tail structure of the aircraft. This reticule box 68 is disposed adjacent to the eyepiece of the gun sight 63. Within the reticule box 68 a reticule is movably mounted so that it may move in, or parallel to, the focal plane of the eyepiece. Means are provided, as hereinafter described, for moving the reticule so that it will appear in the visual image which passes to the eye of the gunner, in a position to indicate the point in the field at which the gun 55 may be aimed at any time.

Figures 7, 8, 9:
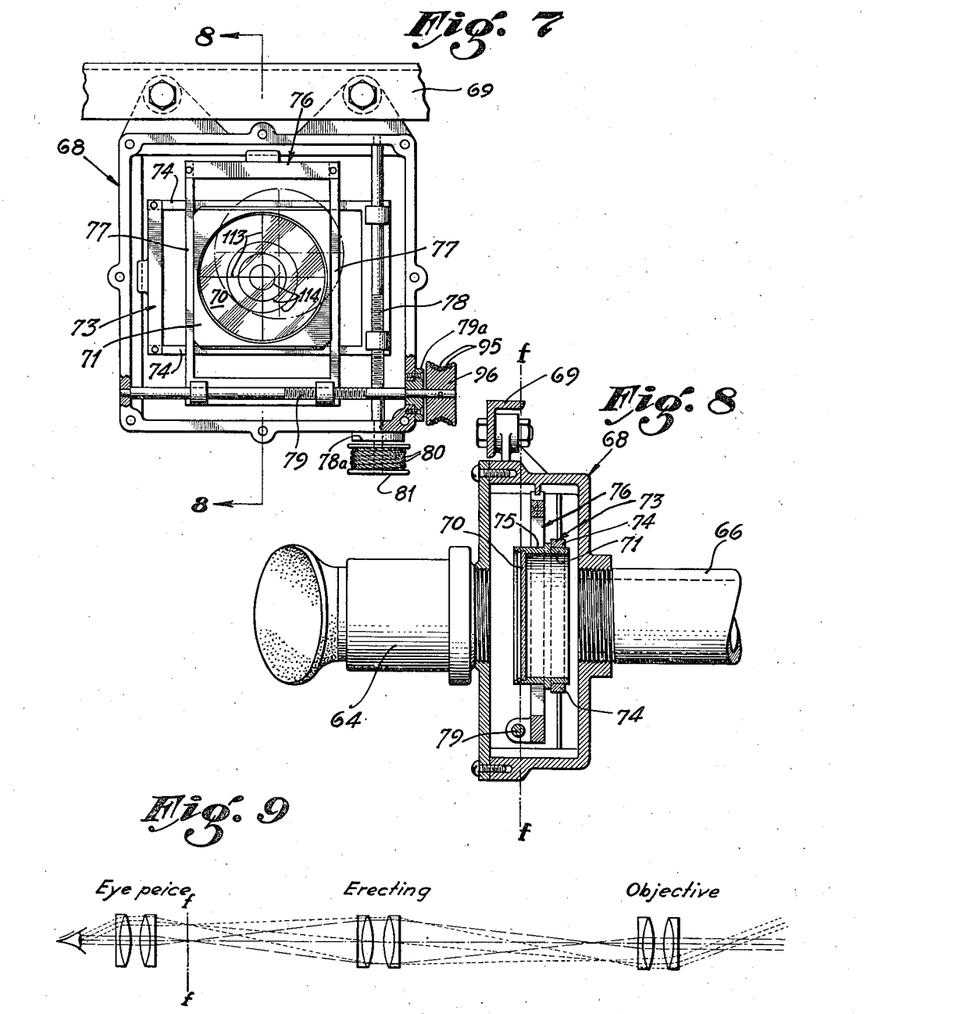
Fig. 7 is an enlarged fragmentary section taken as indicated by the line 7—7 of Fig. 1.
Fig. 8 is a fragmentary section taken on a plane represented by the line 8—8 of Fig. 7.
Fig. 9 is a diagram of the lens system of the gun sight.

As shown by Fig. 7, the reticule 70 is carried by a reticule frame 71, which is supported in the box 68. One portion 72 of this frame 71, as shown in Fig. 8, projects into a horizontal frame 73 in a manner to slide horizontally or laterally between the upper and lower bars 74 thereof. The remaining portion 75 of the reticule frame 71 projects into a vertically elongated frame 76 in a manner to be slidable along the bars 77 of such frame 76. The horizontally elongated frame 73 is engaged by a vertical screw 78 so as to be moved vertically in either direction from the position in which it is shown in Fig. 7. A horizontal screw 79 engages the vertically elongated frame 76 and may be operated to move the frame 76 horizontally in either direction from the centralized position thereof shown in Fig. 7. These screws 78 and 79 are supported so as to project within the box 68 by suitable anti-friction bearings 78a and 79a. It will be recognized that when the screw 78 is rotated, vertical movement of the frame 73 will move the reticule frame 71 in vertical direction, and such reticule frame 71 will slide along the vertical bars 77. When the screw 79 is rotated, the vertically alongated frame 76 will move the reticule frame 71 along the horizontal bars 74 of the frame 73; accordingly, by operation of screw 78 or screw 79 the reticule 70 may be moved either vertically or horizontally, or by a simultaneous rotation of the screws 78 and 79 the reticule 70 may be moved in any angular direction between vertical and horizontal.

The invention provides means for rotating the screws 78 and 79 in accordance with the vertical and horizontal components of the movement of the gun 55 so that the movement of the reticule 70 in the image of the field to which the gun sight 63 is directed will be in accordance with the movement of the gun and therefore the reticule will indicate in the visual image the point in the field to which the gun is pointed. In order to transmit rotation to the screw 78 in accordance with the vertical component of the movement of the gun 55, I provide a cable 80 which runs over a spool 81 mounted on the exposed end of the screw 78 and is carried to a wheel or drum 82 rotatably supported on the exterior of the side member 48 of the yoke 46 by means of a shaft 83 which projects through the side member 48 and on the inner end thereof carries a gear 84 engage by a gear segment 85 which is adjustably connected to the gun cradle 54 so as to swing around the shaft 53 as the gun cradle 54 is swung vertically. The gear segment 85 includes a plate 86, the lower end of which is turnably mounted on the shaft 53 and has projecting lugs 87 to carry adjusting screws 88 which engage spaced portions of the cradle 54. It will be perceived that by suitable adjustment of the screws 88, the segment 85 may be swung relative to the cradle 54 on the shaft 53 and that when the cradle 54 is swung on the shaft 53 the movement thereof will be transmitted through the screws 88 to the segment. Rotational movement of the segment 85 will transmit rotation through the gear 84 to the drum 82 and the cable 80 will be moved so as to rotate the spool 81 and thereby turn the screw 78, with the result that vertical swinging movement of the cradle 54 on the axle 53 will result in a vertical movement of the frame 73 and the reticule frame 71. For guiding the cable 80, pulleys 89, 90, 91, and 92 are provided. The pulleys 89 and 90 receive the portions of the cable 80 which extend upward from the drum 83 and are supported on the upper end of the shaft or pin 52 by means of a bracket 93, which accordingly rotates with the yoke 46 on the vertical axis A—A. The pulleys 91 and 92 are supported by means of a bracket 94 which is secured to the upper bearing bracket 42. These pulleys 91 and 92 are substantially longitudiually aligned with the spool 81 and engage those portions of the cable 80 extending from the pulleys 89 and 90 to the sheave 81.

Figure 5:
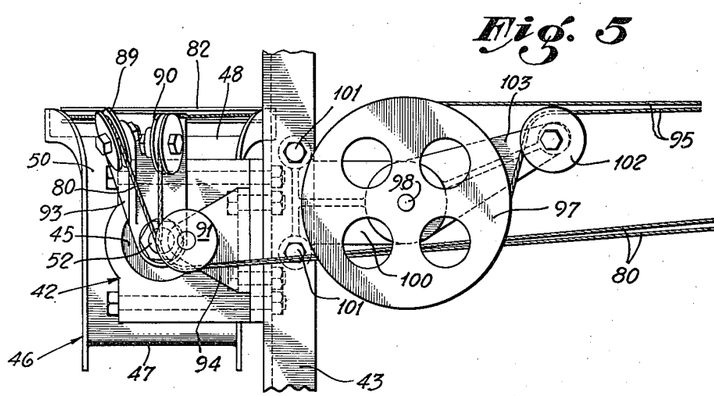
Fig. 5 is a plan view taken from the position indicated by the line 5—5 of Fig. 4.
Figure 6:
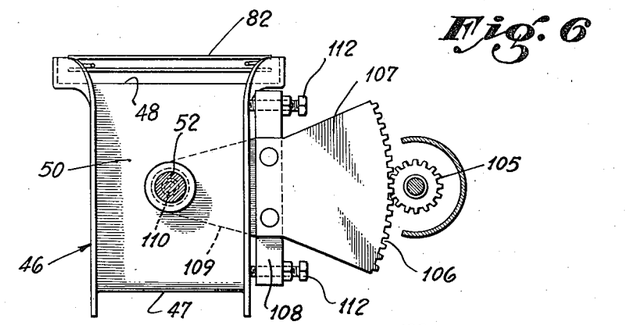
Fig. 6 is a fragmentary sectional view taken as indicated by the line 6—6 of Fig. 4.

To rotate the screw 79 in accordance with the lateral or horizontal component of the movement of the gun 55, I provide a cable 95 which runs over a spool 96 fixed on the exposed end of the screw 79, and extends to a wheel or drum 97 which, as shown in Fig. 4, is fixed on the upper end of a shaft 98 supported for rotation by bearings 99 carried by a bracket 100 which is secured by bolts 101 to the cross brace 43 in a position between the bracket 42 and the reticule box 68. One portion of the cable 95 is carried directly to the wheel 97, but the other portion of the cable extends over a pulley 102 supported in the position thereof shown in Fig. 5 by means of an arm 103 which projects from the bracket 100. On the lower end of the shaft 96 a gear 105 is secured in position to be engaged by a gear segment 106 which is connected to the yoke or frame 46 so as to rotate therewith on the vertical axis A—A. As best shown in Figs. 4 and 6, the gear segment 106 comprises an upper plate 107 connected by a spacer bar 108 with a plate 109 which has limited swinging movement on a screw 110 threaded coaxially into the lower end of the shaft element 52. Adjusting screws 112 are threaded through the extended ends of the bar 108 to engage the top member 50 of the yoke 46. By a suitable in and out adjustment of the screws 112 the gear segment 106 may be swung for limited adjustment on the axis of the screw 110.

As the gun 55 is swung for purpose of aiming the lateral component of its movement will be accompanied by a rotation of the yoke 46 on the axis A—A. This rotation will be transmitted through the segment 106 to the gear 105, thereby rotating the wheel 97 so as to move the cable 95. Movement of the cable 95 will transmit rotation to the screw 79 through the spool 96, thereby causing a corresponding lateral movement of the vertically elongated frame 76 which will move the reticule frame 71 in the horizontal or lateral guides formed by the bar 74 of the frame 73. If the gun is swung in any diagonal direction, or in any direction other than vertical or horizontal, the vertical and horizontal components of the movement imparted to the gun will be transmitted through the gear and cable means to the reticule frame 71 with the result that the reticule 70 will be given a movement in the reticule box similar to the movement of the gun, and when the gun is brought to rest in any position, the position of the reticule 70 in the image which passes through the focal plane f—f will indicate the point in the field at which the gun is pointed. The reticule 70 may comprise merely a central point, or it may be the point of crossing of strands or lines 113. The reticule 70 may likewise embrace concentric circles 114 for reference of the gunner in compensating for the various elements for which the sighting of the gun may be corrected, for example, drop of trajectory, parallax, lead, etc.

It is recognized that in the construction of the device corrections for certain conditions must be made. A simple proportionality of the reticule displacement with the angular movement of the gun and its yoke would introduce a number of aiming errors which will now be discussed together with proposed means for combatting them.

Tangent correction may be accomplished in accordance with the following. If the eyepiece were optically equivalent to a peephole at a focal distance $f$ from the reticule plane, then the lateral displacement of the crosshair in the reticule plane should be $f \tan \alpha$ ($\alpha$ being the longitude angle of the transverse gun yoke rotation) if the aim is to remain parallel to the gun barrel. In order to produce the tangent function, a suitable kinematic linkage can be provided. For instance, I propose to crown the cable drums 81 and 96 on the lead screw shafts in torus fashion. As one side of a cable unwinds from a drum and the other side winds up on it the effective drum radius changes in such proportion that the drum rotation is proportional to the tangent of the angular travel of the segment driving the cable through gear and pulley.

Corrections for orthogonal distortion may be accomplished as follows. In reality the eyepiece does not necessarily act optically as a peephole. The focal image of the field may be distorted: a point at a radial distance $r$ from the optical axis in the reticule plane appears at a sighting angle whose tangent is $r/f$ so long as $\alpha$ is small but it may differ more and more from $r/f$ as $\alpha$ increases towards the edge of the field. In order to correct for this influence I propose to crown the cable drum some more (or less) than for the tangent correction according to whether the distortion is negative or positive. In fact, with positive distortion exceeding the tangent influence, the generatrix of the torus becomes concave rather than convex.

If the distortion inherent to the eyepiece is pronounced, then another error creeps in when the gun is moved obliquely in space, i. e., if excursions in longitude and latitude are made simultaneously. This error is due to the fact that a pair of orthogonally displaceable reticule positioning frames position the cross hair at the geometric resultant $r = \sqrt{x^2 + y^2}$ of the horizontal and vertical component displacements $x$ and $y$. They will, however, appear to the eye at an angular excursion greater than $c = \sqrt{a^2 + b^2}$ if $a$ or $b$ are the apparent excursions of $x$ or $y$ alone in the absence of one another, because the angle corresponding to $r$ is greater than that to either $x$ or $y$.

To minimize this diagonal distortion error which is zero along the axes and a maximum at 45° between them, I find it convenient to split the difference and so figure the drum shape that a small negative error is deliberately incurred, but the extreme error is accordingly mitigated and the area over which the error is kept tolerably small is vastly extended.

I am aware of the fact that a kinematic error is introduced by swinging the gun in a universal joint system of pivots through longitude and latitude angles, these two motions not being kinematically equivalent as the former is a rotation about an axis fixed in the airplane and the latter is not. Therefore if the aforementioned orthogonal distortion is equally corrected for both the horizontal and the vertical frame drives, then the gun is actually pointed neither at a point indicated by the coordinates $x$, $y$, nor by $a$, $b$, but by some point vertically above the point $a$. This error is a function of both longitudinal ($\alpha$) and latitudinal ($\beta$) excursion; it is zero at $\alpha = 0$ or $\beta = 0$ but maximum in a region where both angles are large and $\alpha$ slightly larger than $\beta$. To minimize this error I again find it convenient to deliberately introduce a small negative error, thereby reducing the extreme error and expanding the area of tolerably small error. I find it convenient to achieve this compromise by a slight change in the transmission ratios, the vertical drive being geared up more than the horizontal. It should be noted that the radial component of the latitude curvature error opposes the diagonal distortion error if the distortion is positive.

If the optical and kinematic corrections were such that the aim is parallel with the gun barrel and even if additional corrections for trajectory drop and range, and other inherent ballistic deviations were accurate, there would remain the phoronomic influences of the speed components across the line of sight both of the target and of the muzzle. To compensate these completely under all firing conditions of aerial combat elaborate apparatus would be necessary. However, the most dangerous conditions may be those for which the enemy would be considered in an advantageous position for attack, i. e., flying approximately toward the craft we wish to defend while the latter proceeds on its mission in steady flight without maneuvering to shake off the pursuer. In this condition the most important need for phoronomic correction is that due to the defender's own flight speed being imparted to the projectile as it leaves the muzzle.

The proper correction for this error consists in an excess excursion of the reticule approximately in inverse proportion to the ratio of projectile velocity to the difference between projectile and flight velocity. I propose to so design the kinematic transmission that the ratio between reticule motion and gun motion is approximately increased by the stated amount over that required for optical correction only. By way of example this increase would be of the order of 15% for a flight speed of 400 ft./sec. and a projectile speed of 3000 feet/sec.

Various means are provided to make adjustments on the reticule drive system. Slight corrections for bore sighting or windage and elevation errors inherent to the gun can be made by adjusting the turnbuckles 115 which are inserted in the cables. Further adjustments can be effected by means of screws 112 and 88 positioning the segments on the yoke and gun carrier respectively. It is then unnecessary to provide adjustment on the telescope proper so that the latter can be permanently mounted in the airplane structure although shock absorbing elements may be inserted in this mount to keep vibrations away from the gunner's eye.

*Variants*

The means provided to achieve the recognized functions hereinbefore indicated may take a variety of forms. The reticule was described as being placed in the focal plane of the eyepiece while it can also be positioned in the focal plane of the field lens. The former position has the advantage that more room is available in the streamlined airplane structure to accommodate the reticule housing in a place where the width of the structure is greater. The cable spools 81 and 96 have each been described as a single curved winch drum which winds up the one cable as it pays out the other. To avoid the (very slight) tightening or slackening of the rigging tension of the cable separate individually curved drums may be provided for each cable end ensuring that the cables wind up and pay out tangent to exactly the same radius. Other means such as a spring loaded idler may be provided instead to keep the cable rigging load constant.

The cable drive may be replaced by other mechanical transmission means such as linkages or torque tubes or by electrical means such as Selsyn motors or servo motor controls. The unproportionality corrections may then be introduced by means of cams, linkages, unround gears or the like. The lead screw spindles and nuts may be also replaced by cams and cam followers.

The reticule has been described as a frame 71 floating between two guiding frames 73 and 76. There are other kinematic means to position the reticule in two coordinates. For instance, one frame may travel upon and with respect to the other after the manner of a microscope stage. Also it is possible to build some curvature into one or both frames, thereby guiding the reticule on a curved surface instead of in a focal plane provided the optics have sufficient depth of focus. This artifice of curved reticule travel can then be put to use in effecting some of the corrections previously described, notably that of the latitude curvature error.

Figure 10:
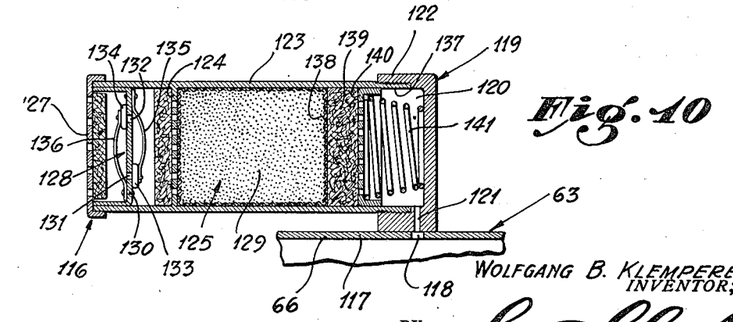
Fig. 10 is a fragmentary cross-section through the desiccator of the gun sight.

As a further feature of the invention, the gun sight 63 is provided with a desiccator 116 which may be suitably connected to the housing of the gun sight, for example, as shown in Fig. 1. The wall 117 of the housing 66 has a breather opening or passage 118 connecting the interior of the housing 66 with the exterior atmosphere through the desiccator 116, the internal spaces of the gun sight 63 are all inter-connected so that there may be a relatively free flow of air from one internal space to another as pressure conditions between the spaces within the gun sight 63 vary. In Fig. 10 the desiccator 116 is shown as including a fitting 119 which is secured to the wall 117 so that a recess 120 therein will communicate through a passage 121 with the breather passage 118. A wall 122 of the recess 120 is threaded so as to receive a detachable chamber in the form of a tube 123 having near its front end a transverse perforate wall 124 against which a desiccator cartridge 125 may rest. Between the transverse wall 124 and the perforate end wall 127 of the tube 123 there is a valve means 128 to isolate the desiccant 129 of the cartridge 125 from moisture of the external atmosphere, but permitting such flow of air as may be required for the normal breathing of air in and out of the gun sight 63.

The valve means 128 includes a transverse wall 130 having an inlet opening 131 and an outlet opening 132, these openings being respectively provided with flow restraining valve closure elements 133 and 134, held respectively against the inner and outer ends of the openings 131 and 132 by small springs 135 and 136.

When the tube 123 is removed from the fitting 119, the desiccant cartridge 125 may be inserted through the open inner end 137 of the tube. Against the pervious wall 138 of the cartridge 125 a dust filter 139, comprising a wall of fibrous material may be placed, this being followed by a perforate wall 140 against which a spring 141 presses when the tube 123 is again attached to the fitting 119. Should there be a decrease in the pressure of the atmosphere external to the gun sight 63 and the desiccator 123, for example, as the result of ascent of the aircraft, there will be a flow of air out through the breather passage 118 and out through the outlet valve opening 132 when the pressure differential is sufficient to displace the closure member 134 against the relatively small pressure of the spring 136. When the external pressure again increases, for example, as the result of descent of the aircraft, air will pass in through the inlet opening 131 when the pressure differential is sufficient to displace the closure member 133 against the small force of the spring 135. Such air will pass through the mass of desiccant material 129, then through the filter 139 and through the passage 118 into the housing of the gun sight. The desiccant 129 may be any suitable water absorbing material such as activated alumina, silica jell, etc., which will dry the air to such extent that there will be no fogging of the lenses or optical surfaces within the gun sight 63. The desiccator 110 is situated in a position convenient to the gunner, who from time to time as may be required may replace a spent cartridge 125 with an unused or active one.

I claim as my invention:

1. In a gunnery device of the character described, the combination of: a supporting structure; a gun connected to said supporting structure so as to be swung relative to said structure for the purpose of aiming the same; a gun sight mounted rigidly in said supporting structure and having optical means to produce an image of the field in which said gun may be aimed; and means operating to indicate in said image the point in said field at which said gun is aimed, said indicating means being connected to said gun so as to move relative to the gun sight in accordance with the angular movement of said gun as said gun is aimed at a target appearing in said field and in said image.

2. In a gunnery device of the character described, the combination of: a gunner's support; an optical means disposed in a position contiguous to said gunner's support and having a lens system for producing an image of the field at which said optical means is directed; a gun swingably supported so as to be aimed at points in said field and in such manner that as it swings its angle relative to said optical means will change; and means connected to said gun so as to be controlled by the movement of said gun, to indicate on said image the point in said field at which said gun is aimed at any time.

3. In a gunnery device of the character described, the combination of: a gun sight having means defining a plane intercepting the path of light carrying an image from a field to a receiving optical element; a gun mounted for movement relative to said gun sight and so as to be aimed at points in said field; and means connected to said gun so as to be controlled in accordance with the movement of said gun relative to said gun sight, to indicate in said plane a point positioned in accordance with the point in said field at which said gun is aimed.

4. In a gunnery device of the character described, the combination of: a gun sight having optical means to produce in a focal plane an image of the field at which said gun sight is directed; a gun supported movably relative to said gun sight and so as to be aimed at different points in said field; and means connected to said gun so as to be controlled by the movement thereof relative to said gun sight, and operating to indicate in said focal plane and said image, the point in said field at which said gun is aimed.

5. In a gunnery device of the character described, the combination of: a telescopic gun sight having optical means to produce an image of the field at which the gun sight is directed; a reticule movable in the field of view of said gun sight and in a plane transverse to the line of sight; a gun mounted for movement relative to said gun sight so as to be aimed at points in said field; and means connected to said gun so as to be controlled by the movement thereof, and operating to move said reticule in accordance with the movement of said gun relative to said gun sight so that said reticule will indicate in said image the point in said field at which said gun is aimed.

6. In a gunnery device of the character described, the combination of: a gunner's support; a gun sight for use of a gunner occupying said support, said gun sight being supported stationary relative to said support and having optical means to produce in a focal plane an image of the field at which said gun sight is directed; a gun supported in swingable relation to said gunner's support and said sight so as to be aimed by said gunner at points in said field; and means connected to said gun so as to be controlled by the angular movement thereof, and operating to indicate in said focal plane and said image, the point in said field at which said gun is aimed.

7. In a gunnery device of the character described, the combination of: a gunner's support; a telescopic gun sight supported in a substantially stationary relation to said gunner's support so as to be used by a gunner occupying said gunner's support, said gun sight having optical means to produce an image of the field at which the gun sight is directed; a reticule movable in the field of view of said gun sight and in a plane transverse to the line of sight; a gun supported in movable relation to said gun sight and so as to be aimed by said gunner at points in said field; and means connected to said gun so as to be controlled by the movement thereof, and operating to move said reticule in accordance with the movement of said gun so that said reticule will indicate in said image the point in said field at which said gun is aimed.

8. In a gunnery device of the character described, the combination of: a telescopic gun sight having means to produce an image of the field at which said gun sight is directed; reticule means movably mounted in the field of view of said sight; means for moving said reticule means in a first direction and means for moving said reticule means in a second direction crossing said first direction, both directions being transverse to the line of sight, whereby said reticule means may be moved to any position in said field of view; a gun supported for universal movement relative to said gun sight, so as to be aimed at points in said field; means connecting said gun and said reticule means so that angular movement of said gun in one plane will move said reticule means in said first direction thereof; and means connecting said gun and said reticule means so that movement of said gun in a plane transverse said first mentioned plane will move said reticule means in said second direction thereof.

9. In a gunnery device of the character described, the combination of: a fixedly mounted telescopic gun sight having means to produce in a plane an image of the field at which the gun sight is directed; a first reticule member movable in a direction substantially parallel to said plane; a second reticule member movable in a direction crossing the line of movement of said first reticule member and substantially parallel to said plane, both said reticules being located within the field of view of said sight; a gun support having universal movement relative to said gun sight so as to be aimed at a point in said field; means connecting said gun to said first reticule member so that a movement of said gun in a first plane will move said first reticule member; and means connecting said gun to said second reticule member so that movement of said gun in a second plane at a substantial angle to said first plane will move said second reticule member, whereby the positions of said reticule members will indicate in said image the point in said field at which the gun is aimed.

10. In a gunnery device of the character described, the combination of: a telescopic gun sight comprising an optical lens system for transmitting an optical image of the field ahead of said gun sight, said gun sight including a reticule housing, movable reticule means in said housing transversely to the line of sight of the lens system, a first frame for said reticule means movable in a first direction, and a second frame for said reticule means movable in a second direction crossing said first direction; a gun supported for universal movement relative to said gun sight and so as to be aimed at points in said field; means operating to move said first frame in said first plane when said gun is moved relative to said gun sight in one direction; and means operating to move said second frame in said second direction when said gun is moved relative to said gun sight in a second plane disposed at a substantial angle to said first named plane.

11. In a gunnery device of the character described, the combination of: a gun sight having means defining a plane intercepting the path of light carrying an image from a field to a receiving optical element; a gun mounted for movement relative to said gun sight and so as to be aimed at points in said field; means connected to said gun so as to be controlled in accordance with the movement of said gun, to indicate in said plane a point positioned in accordance with the point in said field at which said gun is aimed; and adjusting means associated with said last named means to vary the functioning of said last named means to embrace corrections for conditions encountered in the practical use of the device.

12. In a gunnery device of the character described, the combination of: a telescopic gun sight having optical means to produce an image of the field at which the gun sight is directed; a reticule movable in the field of view of said gun sight; a gun mounted for movement relative to said gun sight and so as to be aimed at points in said field; and means connected to said gun and to said reticule and operating to move said reticule in accordance with the movement of said gun and in such proportion to the movement of said gun as to introduce in the movement of said reticule corrections to compensate for conditions which may be encountered in the practical use of the device.

13. In a gunnery device of the character described, the combination of: a gun sight having optical means to produce an image of a field toward which the gun sight is directed; a gun mounted for movement relative to said gun sight whereby it may be aimed at different points in said field; movable reticule means for producing a reticule image in the field of view of said gun sight; and means connected to said gun and to said reticule means operating in response to movement of said gun relative to said gun sight to move said reticule means in accordance with said movement of said gun.

14. In a gunnery device of the character described, the combination of: a gun sight having optical means for bringing to the vision of a gunner the field toward which the gun sight is directed; a gun mounted for movement relative to said gun sight whereby said gun may have aiming movement in said field; movable reticule means in said field for reference of the gunner in aiming said gun; and control means connected to said gun and to said reticule means to move said reticule means in said field in accordance with said movement of said gun relative to the gun sight, said control means being so formed as to produce movements of said reticule means in said field of such proportions of the corresponding movements of said gun in said field as to compensate for tangent and distortion errors in said gun sight.

15. In a gunnery device of the character described, for use in aircraft, the combination of: a gun sight having optical means for bringing to the vision of a gunner the field toward which the gun sight is directed; a gun mounted for movement relative to said gun sight whereby said gun may have aiming movement in said field; movable reticule means in said field for reference of the gunner in aiming said gun; and control means connected to said gun and to said reticule means to move said reticule means in said field in accordance with said movement of said gun relative to the gun sight, said control means being so formed as to produce movements of said reticule means in said field of such proportions of the corresponding movements of said gun in said field as to compensate for kinematic errors in the use of the gun sight with the gun.

16. In a gunnery device of the character described, for use in aircraft, the combination of: a gun sight having optical means for bringing to the vision of a gunner the field toward which the gun sight is directed; a gun mounted for movement relative to said gun sight whereby said gun may have aiming movement in said field; movable reticule means in said field for reference of the gunner in aiming said gun; and control means connected to said gun and to said reticule means to move said reticule means in said field in accordance with said movement of said gun relative to the gun sight, said control means being so formed as to produce movements of said reticule means in said field of such proportions of the corresponding movements of said gun in said field as to compensate for phoronomic errors in the use of the gun sight with the gun.

17. In a gunnery device of the character described, for use in aircraft, the combination of: a gun sight having optical means for bringing to the vision of a gunner the field toward which the gun sight is directed; a gun mounted for movement relative to said gun sight whereby said gun may have aiming movement in said field; movable reticule means in said field for reference of the gunner in aiming said gun; and control means connected to said gun and to said reticule means to move said reticule means in said field in accordance with said movement of said gun relative to the gun sight, said control means being so formed as to produce movements of said reticule means in said field of such proportions of the corresponding movements of said gun in said field as to compensate for errors in the gun sight proper and for kinematic errors, with an increase in the excursion of the reticule means relative to the excursion of the gun to compensate for phoronomic error.

18. In reticule means for use with a gun sight, the combination of: a reticule housing; movable reticule means in said housing; a first reticule frame movable along a first line of movement; a second reticule frame movable in a second line of movement which crosses said first line of movement at a substantial angle, said frames having sliding engagement with said reticule means; and means operative from the exterior to move said frames along their respective lines of movement, whereby the cooperative movement of said frames will move said reticule means in a plurality of directions.

19. In reticule means for use with a gun sight, the combination of: a reticule housing; movable reticule means in said housing; a first reticule frame movable along a first line of movement; a second reticule frame movable in a second line of movement which crosses said first line of movement at a substantial angle, said frames having sliding engagement with said reticule means; screw means connected to said frames to move the same; spools connected to said screw means to rotate the same; and cable means running on said spool means to impart rotation thereto.

20. In a gunnery device of the character described, the combination of: a telescopic gun sight having means to produce in a plane an image of the field at which the gun sight is directed; a first reticule member movable in a direction substantially parallel to said plane; a second reticule member movable in a direction crossing the line of movement of said first reticule member and substantially parallel to said plane; a gun support having universal movement relative to said gun sight so as to be aimed at a point in said field; means connecting said gun to said first reticule member so that a movement of said gun in a first plane will move said first reticule member; and means connecting said gun to said second reticule member so that movement of said gun in a second plane at a substantial angle to said first plane will move said second reticule member.

WOLFGANG B. KLEMPERER.